US009851258B2

(12) United States Patent
Pei et al.

(10) Patent No.: US 9,851,258 B2
(45) Date of Patent: *Dec. 26, 2017

(54) THERMOPILE TEMPERATURE SENSOR WITH A REFERENCE SENSOR THEREIN

(71) Applicant: Maxim Integrated Products, Inc., San Jose, CA (US)

(72) Inventors: Cheng-Wei Pei, Belmont, CA (US); Craig A. Easson, San Jose, CA (US); Arvin Emadi, Santa Clara, CA (US); Nicole D. Kerness, Menlo Park, CA (US); Stanley Barnett, San Francisco, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 14/671,007

(22) Filed: Mar. 27, 2015

(65) Prior Publication Data

US 2016/0123816 A1    May 5, 2016

Related U.S. Application Data

(60) Provisional application No. 62/074,851, filed on Nov. 4, 2014.

(51) Int. Cl.
*G01J 5/00* (2006.01)
*G01J 5/12* (2006.01)
*G01J 5/04* (2006.01)
*G01J 5/06* (2006.01)

(52) U.S. Cl.
CPC ............... *G01J 5/12* (2013.01); *G01J 5/045* (2013.01); *G01J 5/06* (2013.01); *G01J 2005/068* (2013.01)

(58) Field of Classification Search
None
See application file for complete search history.

(56) References Cited

U.S. PATENT DOCUMENTS

| 2005/0017175 | A1* | 1/2005 | Lee | B81B 7/0067 |
| | | | | 250/338.1 |
| 2006/0262829 | A1* | 11/2006 | Manlove | G01J 5/16 |
| | | | | 374/120 |
| 2008/0202209 | A1* | 8/2008 | Lambkin | G01J 1/04 |
| | | | | 73/31.05 |

(Continued)

*Primary Examiner* — Nina Bhat
(74) *Attorney, Agent, or Firm* — Advent, LLP

(57) ABSTRACT

A sensor package having a thermopile sensor and a reference thermopile sensor disposed therein. In one or more implementations, the sensor package includes a substrate, a thermopile sensor disposed over the substrate, a reference thermopile sensor disposed over the substrate, and a lid assembly disposed over the thermopile sensor and the reference thermopile sensor. The lid assembly includes a transparent structure that passes electromagnetic radiation occurring in a limited spectrum of wavelengths and an electromagnetic blocker disposed over the lid assembly. The electromagnetic blocker defines an aperture over the thermopile sensor such that at least a portion of the electromagnetic blocker is positioned over the reference thermopile sensor. The electromagnetic blocker is configured to at least substantially block the electromagnetic radiation occurring in a limited spectrum of wavelengths from reaching the reference thermopile sensor.

13 Claims, 5 Drawing Sheets

(56) References Cited

U.S. PATENT DOCUMENTS

| | | | |
|---|---|---|---|
| 2014/0036953 A1* | 2/2014 | Kimura | G01J 5/16 |
| | | | 374/121 |
| 2015/0076351 A1* | 3/2015 | Noguchi | G01J 5/0225 |
| | | | 250/338.3 |
| 2015/0137304 A1* | 5/2015 | Mao | G01J 5/022 |
| | | | 257/467 |
| 2016/0079306 A1* | 3/2016 | Kropelnicki | H01L 27/16 |
| | | | 257/467 |

* cited by examiner

THERMOPILE TEMPERATURE SENSOR WITH A REFERENCE SENSOR THEREIN

CROSS-REFERENCE TO RELATED APPLICATIONS

The present application claims the benefit under 35 U.S.C. §119(e) of U.S. Provisional Application Ser. No. 62/074,851, filed Nov. 4, 2014, and titled "THERMOPILE TEMPERATURE SENSOR WITH A REFERENCE SENSOR THEREIN," which is herein incorporated by reference in its entirety.

BACKGROUND

Thermopile sensors convert thermal energy into electrical energy. These sensors may utilize several thermocouples to generate an output voltage proportional to a local temperature difference (e.g., a temperature gradient). These thermopile sensors may be utilized in the medical industry to measure body temperature, in heat flux sensors, and/or gas burner safety controls.

SUMMARY

A sensor package having a thermopile sensor and a reference thermopile sensor disposed therein. In one or more implementations, the sensor package includes a substrate, a thermopile sensor disposed over the substrate, a reference thermopile sensor disposed over the substrate, and a lid assembly disposed over the thermopile sensor and the reference thermopile sensor. The lid assembly includes a transparent structure that passes electromagnetic radiation occurring in a limited spectrum of wavelengths (e g , infrared radiation [IR]) and an infrared radiation blocker disposed over the lid assembly. The electromagnetic blocker defining an aperture over the thermopile sensor such that at least a portion of the electromagnetic blocker is positioned over the reference thermopile sensor. The electromagnetic blocker is configured to at least substantially block the electromagnetic radiation occurring in a limited spectrum of wavelengths from reaching the reference thermopile sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

FIG. 1-2 is a partial cross-sectional side view illustrating a sensor package having a first package including a thermopile sensor and a first reference thermopile sensor and a second package including a reference temperature sensor and a second reference thermopile sensor in accordance with an example implementation of the present disclosure.

FIG. 2 is a partial cross-sectional side view illustrating the sensor package shown in FIG. 1-1, where the thermopile sensor, the reference thermopile sensor, and the reference temperature sensor are communicatively connected to an application-specific integrated circuit in accordance with an example implementation of the present disclosure.

DETAILED DESCRIPTION

Overview

Thermopile sensors are utilized in a variety of applications. For example, a thermopile is an infrared radiation (IR) detector (e.g., electromagnetic radiation) that can be used for making non-contact temperature measurements. A thermopile can include several thermocouples coupled together. Thermopiles are used to provide an output in response to temperature as part of a temperature measuring device, such as the infrared thermometers, used to measure body temperature. While thermopiles detect electromagnetic radiation from an object of interest, the thermopiles can also detect electromagnetic radiation from other objects that are not of interest. Also, a thermopile outputs a voltage that depends on the temperature different of the object and its own temperature. Thus, a reference temperature sensor may be utilized to determine the object temperature.

Therefore, a sensor package having a sensing thermopile sensor and a reference thermopile sensor disposed therein. In one or more implementations, the sensor package includes a substrate, a thermopile sensor disposed over the substrate, a reference thermopile sensor disposed over the substrate, and a lid assembly disposed over the thermopile sensor and the reference thermopile sensor. The lid assembly includes a transparent structure that passes electromagnetic radiation occurring in a limited spectrum of wavelengths and an electromagnetic blocker disposed over the lid assembly. The electromagnetic blocker defining an aperture over the thermopile sensor such that at least a portion of the electromagnetic blocker is positioned over the reference thermopile sensor. The electromagnetic blocker is configured to at least substantially block the electromagnetic radiation occurring in a limited spectrum of wavelengths from reaching the reference thermopile sensor. For example, the electromagnetic blocker at least substantially prevents electromagnetic radiation emitted from an object of interest to reach the reference thermopile sensor.

Example Implementations

Figure 1:
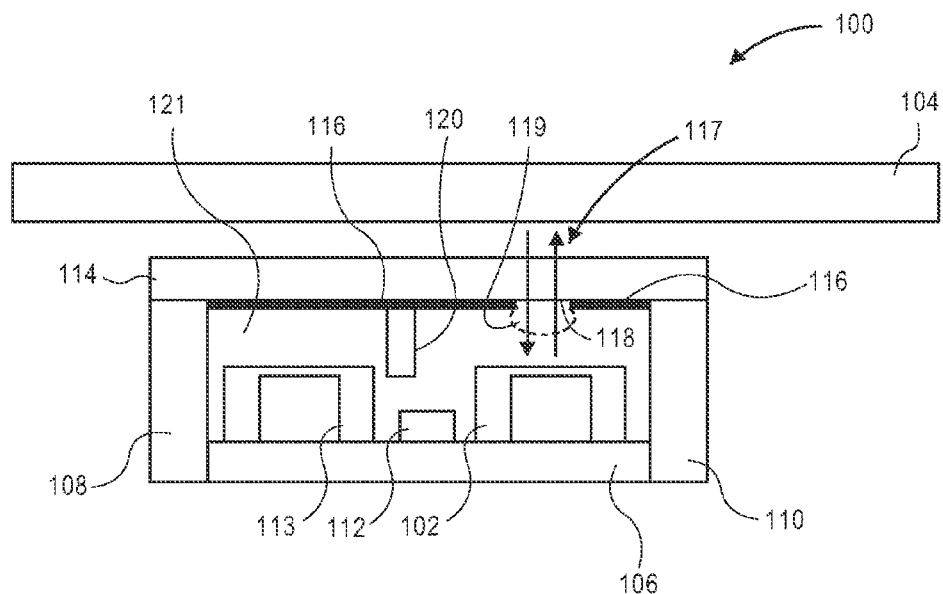
FIG. 1-1 is a partial cross-sectional side view illustrating a sensor package including a thermopile sensor, a reference thermopile sensor, and a reference temperature sensor disposed therein in accordance with an example implementation of the present disclosure.

FIG. 1-1 illustrates an example sensor package 100 in accordance with an example implementation of the present disclosure. As shown, the sensor package 100 includes a thermopile sensor 102 that senses electromagnetic radiation transfer between the thermopile sensor 102 and an object 104. For example, the object 104 emits electromagnetic radiation having a wavelength characteristic according to its temperature. More specifically, the radiation has a wavelength range that depends on the temperature of the object 104. The thermopile sensor 102 senses changes in electromagnetic radiation transfer and translates the electromagnetic radiation change into a corresponding electrical signal (e.g., converts thermal energy into corresponding electrical energy). For instance, the thermopile sensor 102 translates the electromagnetic radiation change into a corresponding voltage signal. In implementations, the thermopile sensor 102 detects electromagnetic radiation having a first limited spectrum of wavelengths (e.g., wavelengths between a first wavelength and a second wavelength). For example, the thermopile sensor 102 is configured to detect electromagnetic radiation occurring within the infrared spectrum. In some implementations, the thermopile sensor 102 includes an absorber to improve the efficiency of the electromagnetic radiation absorption.

As shown, the thermopile sensor 102 is positioned over a substrate 106. The sensor package 100 includes support structure. For example, as shown in FIG. 1, a first wall structure 108 and a second wall structure 110 are employed adjacent to the substrate 106 to at least partially enclose the thermopile sensor 102. The substrate 106 and the wall structures 108, 110 comprise material that at least substantially prevents the transmission of radiation. For example, the substrate 106 and the wall structures 108, 110 may comprise metal materials, metallic alloys, and ceramic materials, such as glass, $SiO_2$, AlN, and/or $Al_2O_3$. In some implementations, the substrate 106 comprises a printed circuit board (PCB). The first wall structure 108 and the second wall structure 110 are illustrated for example purposes. However, it is understood that the support structure may employ multiple wall structures that may be conjoined to enclose the components of the sensor package. The support structure may be utilized to selectively block electromagnetic radiation from entering the sensor package 100. The support structure may also function as a hermetic seal to at least substantially prevent air from entering the sensor package 100.

As shown in FIG. 1-1, the sensor package 100 includes a reference temperature sensor 112 and a reference thermopile sensor 113. The reference temperature sensor 112 may be positioned over the substrate 106 and adjacent to the thermopile sensor 102 and the reference thermopile sensor 113. As shown, the example sensor package 100 also includes a reference thermopile sensor 113. As discussed herein, the thermopile sensor 102 detects electromagnetic (e g , infrared) radiation exchange associated the components within the sensor package 100 and the object 104. The reference thermopile sensor 113 is configured to detect the electromagnetic (e.g., infrared) radiation associated with the components within the sensor package 100. In implementations, as discussed herein, a signal representing the signal from the thermopile sensor 102 subtracted from the signal from the reference thermopile sensor 113. The subtraction may occur within the digital domain or the analog domain.

In an implementation, the reference temperature sensor 112 detects signals that relate to the temperature reference for the thermopile sensor 102 and the reference thermopile sensor 113. For example, as shown in FIG. 1-1, the sensor package 100 includes a transparent structure 114 positioned over the thermopile sensor 102 and the object 104. In some instances, the thermopile sensor 102 and the reference thermopile sensor 113 may be integrated together on the same integrated circuit die. In another instance, the thermopile sensor 102 and the reference thermopile sensor 113 may be separate sensors (e.g., fabricated as standalone die). Additionally, in some implementations, the reference temperature sensor 112 may also be incorporated on or integrated with the standalone die having the thermopile sensor 102 and the reference thermopile sensor 113. The reference temperature sensor 112 may comprise a resistive temperature detector (RTD), a complementary metal-oxide semiconductor based temperature sensor, a thermistor, an integrated bandgap voltage reference, a thin film resistor, or any sensor that converts absolute temperature to an electrically measured signal.

Together, the substrate 106, the support structure (e.g., illustrated as wall structures 108, 110), and the transparent structure 114 at least partially comprises a package that encloses the thermopile sensor 102 and the reference temperature sensor 112. In implementations, the transparent structure 114 is configured to pass electromagnetic radiation occurring within the limited spectrum of wavelengths (e.g., infrared radiation) and to filter light occurring having a wavelength not within the limited spectrum of wavelengths. In some embodiments, the transparent structure 114 comprises silicon. As shown, the sensor package 100 includes an electromagnetic blocker 116 positioned at least partially over the transparent structure 114. The electromagnetic blocker 116 is configured to at least substantially prevent transmission of the electromagnetic radiation occurring within the limited spectrum of wavelengths (as well as other stray electromagnetic radiation). The electromagnetic blocker 116 may comprise a suitable electromagnetic blocking material, such as a metallic material, or the like. Together, the transparent structure 114 and the electromagnetic blocker 116 form a lid assembly 117.

As shown, the electromagnetic blocker 116 defines an aperture 118 over the thermopile sensor 102 such that electromagnetic radiation may be transmitted from the object 104 to the thermopile sensor 102 and prevents the transmission of the electromagnetic radiation from the object 104 to the reference thermopile sensor 113. As shown, the aperture 118 can be defined on the interior surface of the package cavity. However, the aperture 118 can be defined on the exterior surface of the package transparent structure 114 (e.g., side opposite the interior surface). Thus, the thermopile sensor 102 and the reference thermopile sensor 113 are configured to detect temperature variations/gradients within the sensor package 100 (e.g., detect electromagnetic radiation occurring with the limited spectrum of wavelengths emitted from the substrate 106, the wall structures 108, 110, and the transparent structure 114). The thermopile sensor 102 also detects electromagnetic radiation occurring with the limited spectrum of wavelengths emitted from the object 104. In other words, the thermopile sensor 102 generates an electrical signal that corresponds to the electromagnetic radiation emitted from the object 104 (as well as within the package) and the reference thermopile sensor 113 generates an electrical signal that corresponds to electromagnetic radiation emitted within the sensor package 100. In some implementations, the sensor package 100 may include a lens 119 to focus electromagnetic radiation incident upon the lens 119. For example, the lens 119 may shape (e.g., collimate) the electromagnetic radiation incident upon the lens 119 and to transmit the electromagnetic radiation to the thermopile sensor 102 (e.g., to the membrane of the thermopile sensor 102). The lens 119 may be comprised of silicon or other suitable material.

In some implementations, the sensor package 100 includes a berm (e.g., barrier) structure 120 that would be configured to mitigate electromagnetic radiation that entered through the aperture 118 to reach the reference thermopile sensor 113. The berm structure 120 may comprise any suitable material that prevents transmission of electromagnetic radiation within the limited spectrum of wavelengths. The berm 120 may be structure that is mounted or through a suitable epoxy process to the lid assembly 117. In some implementations, the berm 120 serves as a structure to partition a cavity 121 into multiple sections (e.g., a first section including the thermopile sensor 102 and a second section including the reference thermopile sensor). In some implementations, the berm 120 may be mounted to substrate 106 or may be a part of the reference temperature sensor 112.

Figures 1, 2:
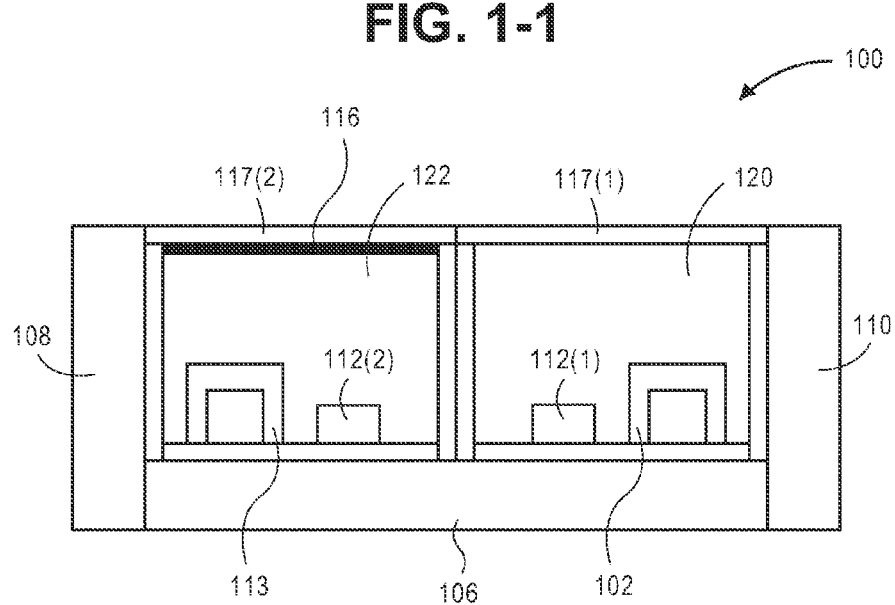
Figure 2:
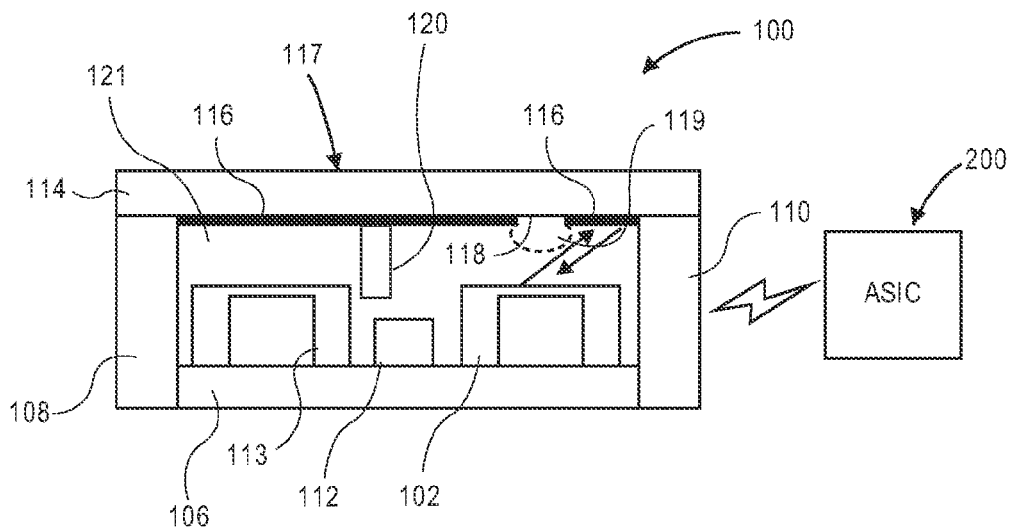

FIG. 1-2 illustrates a sensor package 100 in accordance with another implementation of the present disclosure. As shown, the sensor package 100 may employ a first package 120 (e.g., a first discrete area) and a second package 122 (e.g., a second discrete area). As shown, the first package 120 and the second package 122 are disposed over the substrate 106. For example, the first package 120 and the second package 122 may be mounted to the substrate (e.g., through a suitable epoxy process, etc.). As shown, the first package 120 includes the thermopile sensor 102 and a first reference temperature sensor 112(1). The second package 122 includes the reference thermopile sensor 113 and a second reference temperature sensor 112(2). As shown, each package 120, 122 includes a respective lid assembly 117(1), 117(2). In an implementation, the lid assemblies 117(1), 117(2) are discrete from one another. As shown in FIG. 1-2, the electromagnetic blocker 116 is disposed over a surface of the lid assembly 117(2). The lid assembly 117(1) is configured to pass electromagnetic radiation occurring within the limited spectrum of wavelengths.

Referring to FIG. 2, integrated circuitry 200 (an application-specific integrated circuit) may be employed to generate a digital signal representing the electromagnetic radiation emitted from the object 104 (e.g., determine a temperature associated with the object 104). For example, the application-specific integrated circuit 200 may comprise a module that is electrically connected to the sensor package 100 to receive the electrical signals generated by the thermopile sensor 102 and the reference temperature sensor 112 in response to the electromagnetic radiation occurring within the limited spectrum of wavelengths. In implementations, the circuitry may comprise analog-to-digital converter circuitry, programmable-gain amplifier (PGA) circuitry, fixed-gain amplifier circuitry, combinations thereof, or the like. The application-specific integrated circuit 200 is configured to receive the electrical signal from the thermopile sensor 102, the electrical signal from the reference temperature sensor 112, and the reference thermopile sensor 113 to generate a signal representing a temperature associated with the object 104. For example, the application-specific integrated circuit 200 is configured to remove (e.g., subtract) the electrical signal that is common to both electrical signals (e.g., the electrical signal that represents the electromagnetic radiation associated with the package) and generate a signal that represents the temperature associated with the object 104. In implementations, the application-specific integrated circuit 200 is configured to generate a digital signal representing the temperature associated with the object 104. In an implementation, the application-specific integrated circuit 200 may store calibration parameters to generate corresponding digital calculations.

Figure 3:
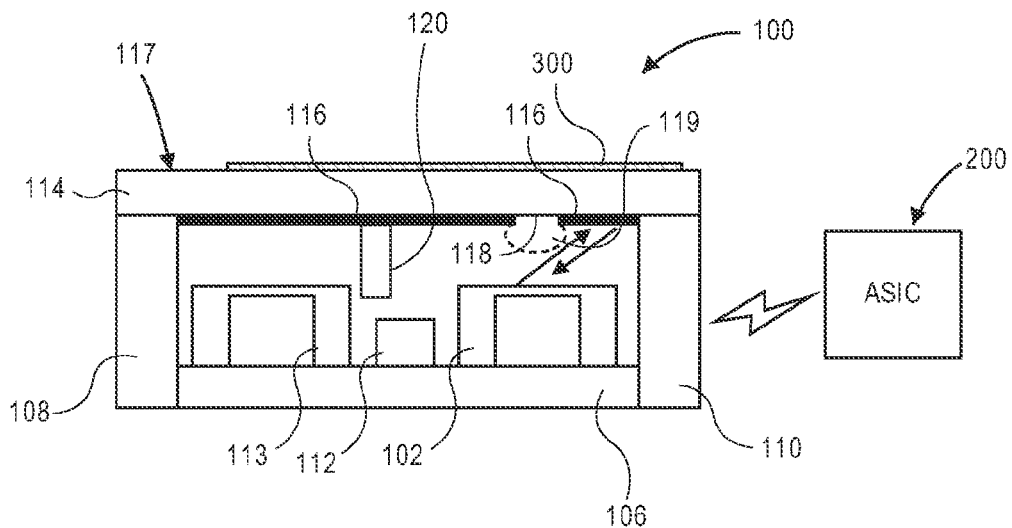
FIG. 3 is a partial cross-sectional side view illustrating the sensor package shown in FIG. 1-1, where an application-specific integrated circuit is operatively connected to a heating element disposed over the lid assembly of the sensor package.

The application-specific integrated circuit 200 is configured to utilize a calibration protocol associated with the sensor package 100. For example, as shown in FIG. 3, the sensor package 100 may employ a heating element 300 that generates a known amount of electromagnetic radiation (e.g., generates a known amount of heat). The heating element 300 can be positioned over the lid assembly 117 to change the temperature of the lid assembly 117 relative to the other components that comprise the sensor package 100. Thus, the thermopile sensor 102 and the reference temperature sensor 112 generate an electrical signal corresponding to the electromagnetic radiation of the sensor package 100 (including the lid assembly that generates electromagnetic radiation based upon the heating element's 300 electromagnetic radiation). The application-specific integrated circuit 200 can remove the electrical signal that is common to both electrical signals to generate an electrical signal representing an error signal associated with the thermopile sensor 102 and/or the reference temperature sensor 112. The application-specific integrated circuit 200 may then be calibrated based upon utilizing the error signal. This calibration protocol may be performed in-situ or during initial factory calibration. In some instances, the heating element 300 circuitry may be integral with the application-specific integrated circuit 200. In other instances, the heating element 300 circuitry may be standalone circuitry (e.g., factory tester equipment, etc.).

Example Processes

Figure 4:
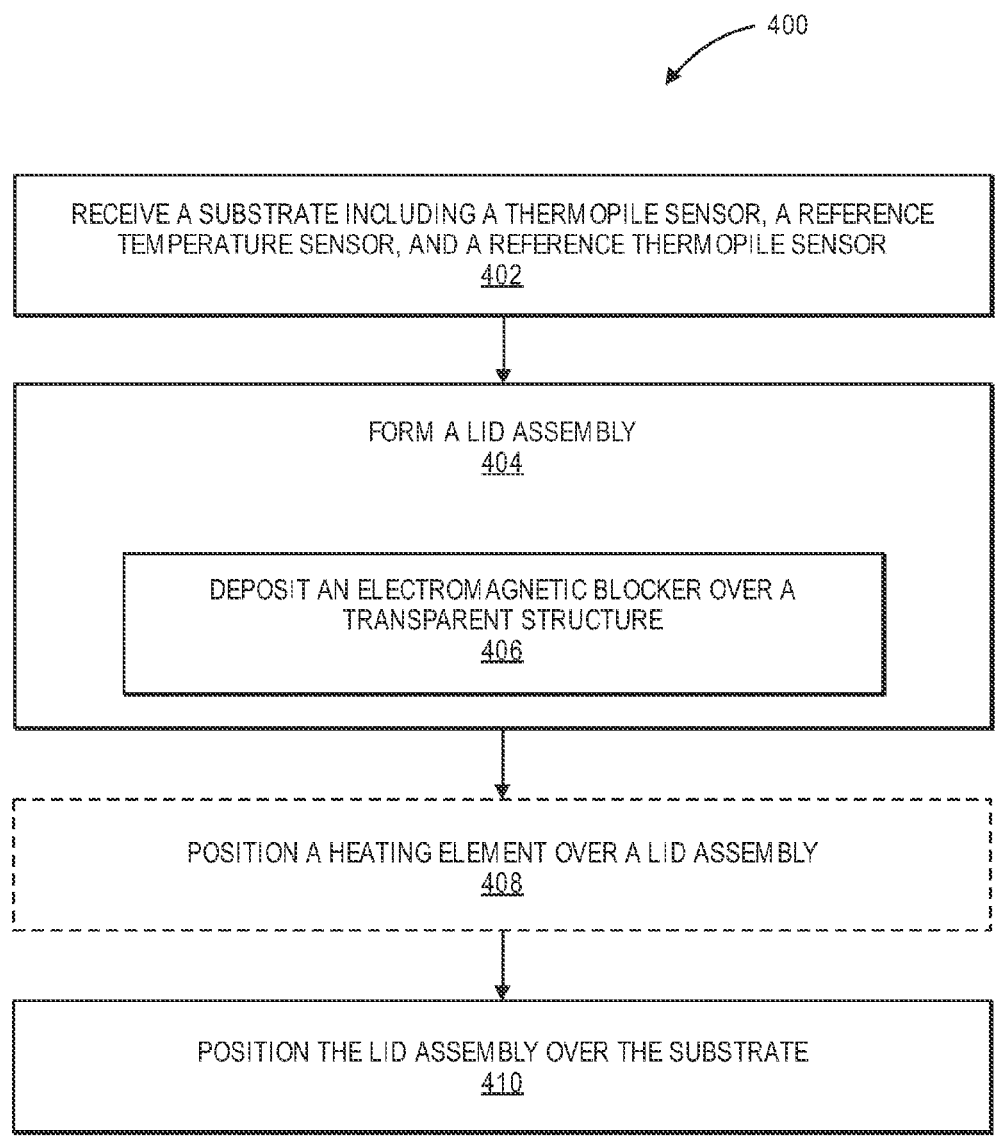
FIG. 4 is flow diagram illustrating a process for fabricating a sensor package in accordance with an example implementation of the present disclosure.
Figure 5:
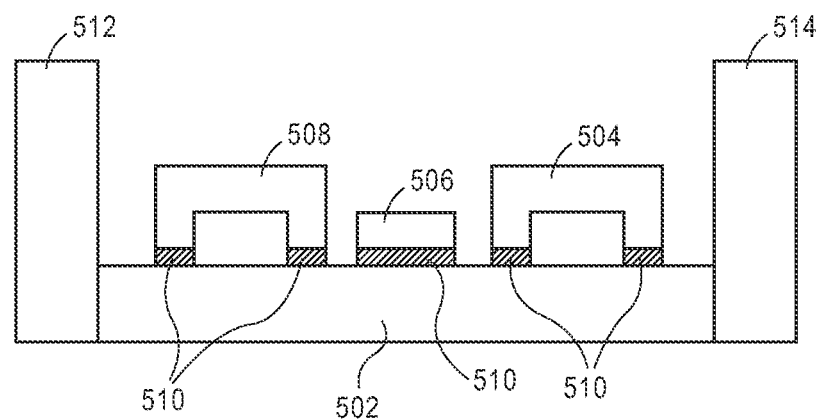
FIG. 5 is a partial cross-sectional side view illustrating a substrate having a thermopile sensor, a reference thermopile sensor, and a reference temperature sensor disposed therein in accordance with an example implementation of the present disclosure.

FIG. 4 illustrates an example process 400 that employs techniques to fabricate temperature sensing devices, such as the sensor package 100 shown in FIGS. 1 through 3. In the process 400 illustrated, a substrate including a thermopile sensor, a reference temperature sensor, and a reference thermopile sensor is received (Block 402). FIG. 5 illustrates an example sensor 500. In some implementations, receiving a substrate 502 can include receiving a printed circuit board, for example, including a thermopile sensor 504, a reference temperature sensor 506, and a reference thermopile sensor 508 that are electrically connected to the printed circuit board using, for example, a die attach adhesive 510. In another implementation, receiving a substrate 502 can include receiving a printed circuit board, for example, including a thermopile sensor 504, and a reference temperature sensor 506 that are electrically connected to the printed circuit board using, for example, a die attach adhesive 510. As shown in FIG. 5, the substrate 502 can include a first wall structure 512 and a second wall structure 514. As shown in FIG. 5, the sensor 500 includes a heating element 515. The heating element 515 can be configured in a variety of ways. For example, the heating element 515 may comprise a separate component. In another example, the heating element 515 may be integrated with the substrate 502. In an implementation, the heating element 515 may be disposed within ceramic and/or the printed circuit board metal layers. In yet another example, the heating element 515 may be positioned over the thermopile sensor 504 and/or the reference thermopile sensor 508.

Figure 6:
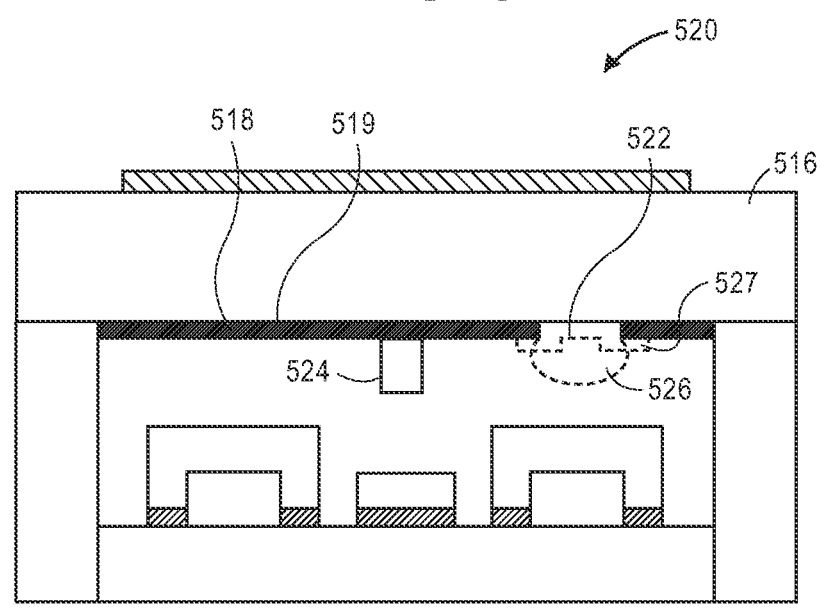
FIG. 6 is a partial cross-sectional side view illustrating a substrate having a lid assembly disposed thereon in accordance with an example implementation of the present disclosure.

As shown in FIG. 4, a lid assembly is formed (Block 404). For example, an electromagnetic blocker is deposited (e.g., formed) over a transparent structure (Block 406). In an implementation, as shown in FIG. 6, a transparent structure 516 is received and an electromagnetic blocker 518 is deposited (e.g., via a suitable deposition techniques) over a surface 519 of the transparent structure 516 (e.g., a structure that is transparent to electromagnetic radiation of interest) to form a lid assembly 520. The electromagnetic blocker 518 can be deposited in such a manner that the electromagnetic blocker 518 defines an aperture 522. In some implementations, a berm 524 is formed over the electromagnetic blocker 518. The berm 524 may be constructed, for example, through suitable molding, reflowing, and/or etching processes. For instance, the berm 524 may be constructed through molding suitable plastic materials or reflowing thermoplastic materials, such as photoresist. Additionally, in some implementations, a lens 526 is disposed over the lid assembly 520. The lens 526 can be formed over the lid assembly 520 through suitable deposition, molding, and/or etching (e.g., dry etching) processes. In some implementations, the sensor 500 includes an optical filter 527. The optical filter 527 is configured to pass electromagnetic radiation in a limited spectrum of wavelengths (e.g., electromagnetic radiation having wavelengths between a first wavelength and a second wavelength [e.g., electromagnetic radiation occurring within desired wavelengths]).

In some implementations, a heating element is positioned over the lid assembly (Block 408). For example, as discussed above, a heating element 519 can be positioned over the lid assembly 520 (see FIG. 6). The heating elements 515, 519 are configured to generate a known amount of electromagnetic radiation. For instance, the heating element 519 is configured to generate a known amount of electromagnetic radiation (e.g., heat) to change the temperature of the lid assembly 520 a known amount. The heating elements 515, 519 may comprise individual components, such as a resistive resistor. In other implementations, the heating elements 515, 519 may comprise resistive elements comprised of metallic and/or silicon-based materials. The As shown in FIG. 4, the lid assembly is position over the substrate (Block 410). In implementations, a lid assembly 520 is positioned over the substrate 502. For example, the lid assembly 520 can be positioned over the wall structures 512, 514 to enclose the thermopile sensor 504 and the reference temperature sensor 506.

Figure 7:
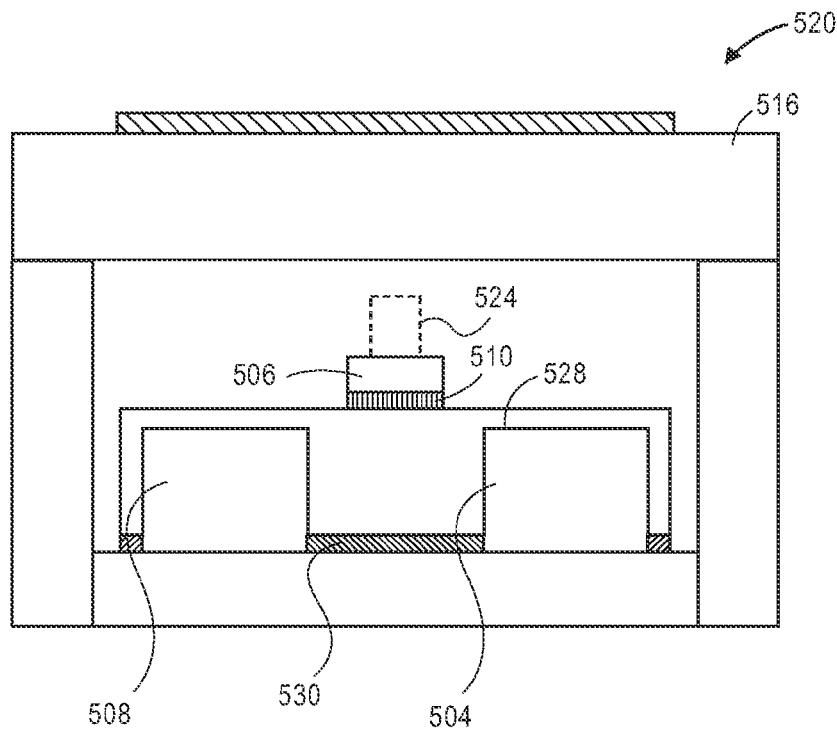
FIG. 7 is a partial cross-sectional side view illustrating a sensor having a die disposed therein in accordance with an example implementation of the present disclosure, where the die includes a thermopile sensor and a reference thermopile sensor integrated therein.
Figure 8:
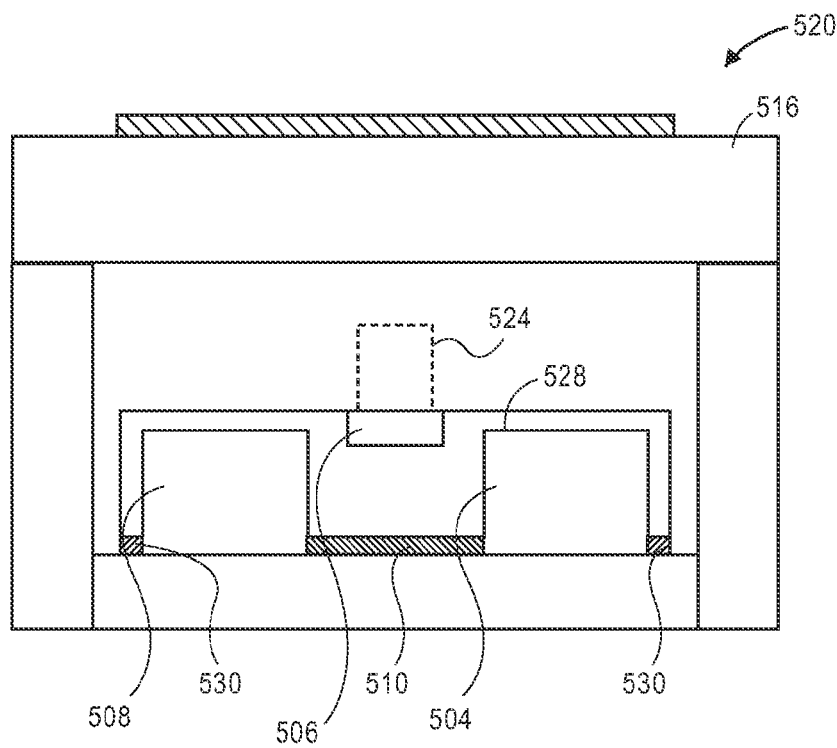
FIG. 8 is a partial cross-sectional side view illustrating a sensor having a die disposed therein in accordance with an example implementation of the present disclosure, where the die includes a thermopile sensor, a reference thermopile sensor, and a reference temperature sensor integrated therein.

FIGS. 7 and 8 illustrate additional implementations of the sensor 500. FIG. 7 illustrates a sensor 500 including a die 528 (e.g., an integrated circuit die) having the thermopile sensor 504 and the reference thermopile sensor 508 integrated therein. As shown, the reference temperature sensor 506 may be disposed over die 528. FIG. 8 illustrates a sensor 500 including the die 528 (e.g., the integrated circuit die) having the thermopile sensor 504, the reference temperature sensor 506, and the reference thermopile sensor 508 integrated therein. As shown in FIG. 7, the die 528 can be attached to the surface of the substrate 502 through a suitable die attach adhesive 530. In an implementation, the die attach adhesive 510 comprises a thermally conductive die attach adhesive, and the die attach adhesive 530 comprises a non-thermally conductive die attach adhesive. FIG. 8 illustrates another implementation of the sensor 500 described above. In this implementation, the die 528 may be attached to the surface of the substrate 502 through suitable die attach adhesive 510, 530. As shown, exterior portions of the die 528 may be attached using a non-thermal conductive die attach adhesive 530 and an interior portion of the die 528 may be attached using a thermal conductive die attach adhesive 510. Thus, in some implementations, the die 528 may be attached to the surface of the substrate 502 utilizing a non-thermal conductive die attach adhesive material. In other implementations, the die 528 may be attached to the surface of the substrate 502 utilizing non-thermal conductive die attach adhesive material and thermal conductive die attach adhesive material.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A sensor package comprising:
a substrate;
a thermopile sensor disposed over the substrate;
a reference thermopile sensor disposed over the substrate;
a reference temperature sensor disposed over the substrate;
a lid assembly disposed over the thermopile sensor, the reference thermopile sensor, and the reference temperature sensor, the lid assembly comprising a transparent structure that passes electromagnetic radiation occurring in a limited spectrum of wavelengths and an electromagnetic blocker disposed over the lid assembly, the electromagnetic blocker defining an aperture over the thermopile sensor,
wherein at least a portion of the electromagnetic blocker is positioned over the reference thermopile sensor, the electromagnetic blocker configured to at least substantially block the electromagnetic radiation occurring in a limited spectrum of wavelengths.

2. The sensor package as recited in claim 1, wherein the electromagnetic blocker comprises at least one of a silicon material, a germanium material, or a metallic material.

3. The sensor package as recited in claim 1, further comprising a support structure disposed about the substrate for supporting the lid assembly.

4. The sensor package as recited in claim 1, further comprising a berm structure disposed between the aperture and the reference thermopile sensor to at least substantially prevent transmission of the electromagnetic radiation occurring in a limited spectrum of wavelengths that passes through the aperture to the reference thermopile sensor.

5. The sensor package as recited in claim 1, wherein the thermopile sensor and the reference thermopile sensor are integrated within the same integrated circuit die.

6. The sensor package as recited in claim 5, wherein the reference temperature sensor is integrated within the integrated circuit die.

7. The sensor package as recited in claim 1, further comprising a lens disposed over the aperture, the lens configured to collimate electromagnetic radiation occurring in the limited spectrum of wavelengths incident upon the lens and to transmit the collimated electromagnetic radiation to the thermopile sensor.

8. A system comprising:
a sensor package, the sensor package comprising:
a substrate;

a thermopile sensor disposed over the substrate, the thermopile sensor configured to generate a first electrical signal based upon detected electromagnetic radiation;

a reference thermopile sensor disposed over the substrate, the reference thermopile sensor configured to generate a second electrical signal based upon detected electromagnetic radiation;

a reference temperature sensor disposed over the substrate, the reference temperature sensor configured to generate a signal representing a temperature associated with the thermopile sensor and the reference thermopile sensor;

a lid assembly disposed over the thermopile sensor and the reference thermopile sensor, the lid assembly comprising a transparent structure that passes electromagnetic radiation occurring in a limited spectrum of wavelengths and an electromagnetic blocker disposed over the lid assembly, the electromagnetic blocker defining an aperture over the thermopile sensor, wherein at least a portion of the electromagnetic blocker is positioned over the reference thermopile sensor, the electromagnetic blocker configured to at least substantially block the electromagnetic radiation occurring in a limited spectrum of wavelengths; and integrated circuitry in electrical communication with the sensor package, the application-specific integrated circuitry configured to generate an electrical signal corresponding to the detected electromagnetic radiation.

9. The system as recited in claim 8, wherein the electromagnetic blocker comprises a metallic material.

10. The system as recited in claim 8, further comprising a support structure disposed about the substrate for supporting the lid assembly.

11. The system as recited in claim 8, further comprising a heating element disposed over the lid assembly, the heating element configured to generate a known amount of electromagnetic radiation.

12. The system as recited in claim 8, wherein the electrical signal corresponds to a temperature associated with an object.

13. The system as recited in claim 8, further comprising a lens disposed over the aperture, the lens configured to collimate electromagnetic radiation occurring in the limited spectrum of wavelengths incident upon the lens and to transmit the collimated electromagnetic radiation to the thermopile sensor.

* * * * *